Figure 1:
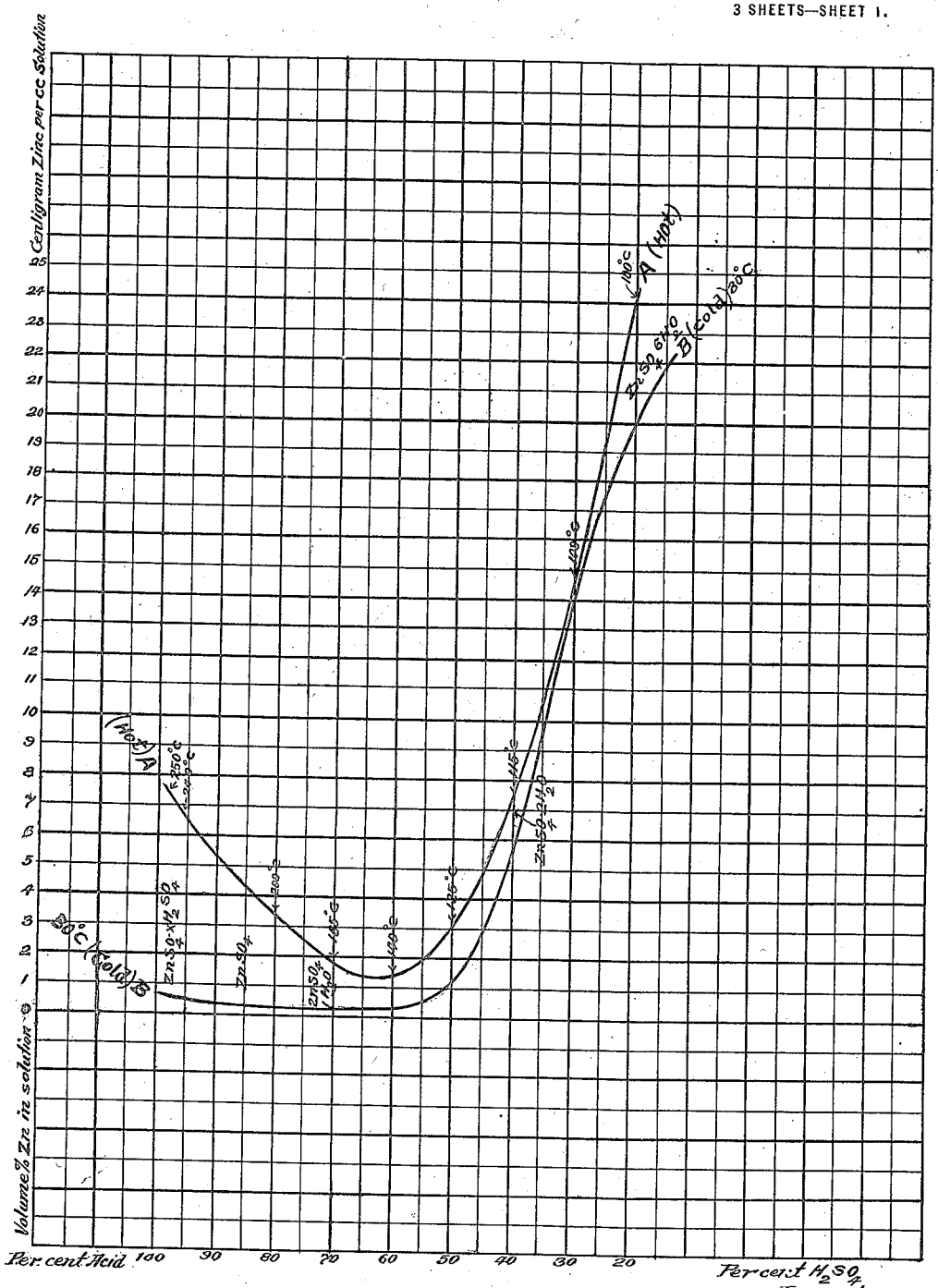

Patented Oct. 31, 1922.

1,434,084

UNITED STATES PATENT OFFICE.

NIELS C. CHRISTENSEN, OF SALT LAKE CITY, UTAH.

PROCESS OF TREATING SULPHIDE ORES OF ZINC.

Application filed September 30, 1919. Serial No. 327,402.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Sulphide Ores of Zinc, of which the following is a specification.

This invention relates to the treatment of sulphide ores of zinc. It is applicable to all classes of the sulphide ores of zinc but is especially adapted to the treatment of the so-called complex ores containing zinc blende (or other zinc sulphide minerals) intimately mixed with other sulphide minerals such as galena chalcopyrite, pyrite, etc.

The object of my process is threefold: to remove the zinc from the ore in a relatively clean product, to leave the other metals in such a form as to be suitable for the recovery of these metals, and to recover the sulphur combined with the zinc.

As is well known to all metallurgists, the treatment of the complex sulphide ores containing zinc is a metallurgical problem of great importance. No satisfactory process has as yet been devised which makes an economical saving of the zinc and also of the lead, copper and gold and silver and other minor metals in the ores.

By my process I secure a practically complete extraction of the zinc from the ores and leave the other constituents of the ore in such forms that they may be readily treated for the recovery of the gold, silver, lead and copper contents.

My process secures these results without roasting the ores and by the methods of wet metallurgy rather than of pyro-metallurgy. My process besides recovering the zinc and leaving the remainder of the ore in suitable condition for the recovery of the other metals, also makes possible the economical recovery of the sulphur combined with the zinc.

The process depends upon the following discoveries which I have made in experimenting with different zinc sulphide ores, especially complex ores of various kinds. I have found that the zinc sulphide minerals are readily acted upon by hot concentrated sulphuric acid, the zinc sulphide being decomposed and zinc sulphate being formed. The exact reactions which take place depend upon the strength of acid and the temperature. I have found that with hot sulphuric acid of concentration less than 50% it is practically impossible to secure a complete extraction of the zinc and as will appear later, strengths of acid less than 50% do not lend themselves to the recovery of the zinc from solution. Sixty per cent acid acts readily upon the zinc sulphide minerals and with a relatively short time of treatment, (from 5 to 30 minutes, depending on the ore, fineness of grinding, etc.) practically all the zinc is changed to sulphate and goes into solution if enough acid is used. The 60% acid has practically no action on galena, chalcopyrite, or pyrite. It acts on the zinc to give zinc sulphate and hydrogen sulphide, as indicated below:

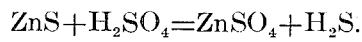
$$ZnS + H_2SO_4 = ZnSO_4 + H_2S.$$

With stronger acids the action on the zinc sulphide is more rapid. The chemical reactions are also different. With 70% acid some sulphur is formed probably by the reduction of the $H_2SO_4$ by the $H_2S$ and with 95% acid practically no $H_2S$ is given off but metallic sulphur is formed probably as indicated below:

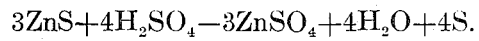
$$3ZnS + 4H_2SO_4 = 3ZnSO_4 + 4H_2O + 4S.$$

The hot concentrated acid dissolves some of the sulphur and also reacts with it to form $SO_2$ as indicated below:

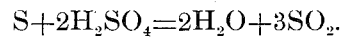
$$S + 2H_2SO_4 = 2H_2O + 3SO_2.$$

The action of the acid on the other constituents of the ore also varies with the concentration. Sixty per cent acid has practically no action on galena, seventy per cent acid very slowly sulphates the galena, 80% acid sulphates the galena and dissolves some of the lead sulphate which is nearly all precipitated with the zinc sulphate upon cooling. 95% acid sulphates the galena very rapidly and dissolves a considerable amount of the lead sulphate, which is only partly precipitated with the $ZnSO_4$ upon cooling. Pyrite and chalcopyrite are not perceptibly acted upon by the sixty or seventy per cent acids, eighty per cent acid has a very slight action, and 95% acid acts but very slowly as compared with its action on the zinc blende or galena. The silver present in the zinc blende is not dissolved by the 60% or 70% acid, but stronger acids dissolve the silver. The silver in the galena is dissolved if the galena is sulphated so that acids above 70% not only attack the galena but also dissolve the silver in the sulphated galena. Most of the silver may be precipitated from the cold acid by the addition of a small amount of common salt. The iron present in the blende is sulphated and is partly precipitated with the zinc sulphate.

The rapidity of the action varies greatly with the concentration of the acid. Practically all the zinc sulphide in most ores is dissolved in thirty minutes or less by 60% acid. The action is much more rapid with 80% acid and with 95% acid is almost instantaneous.

Next in importance in the process to the action of the hot sulphuric acid is the solubility of the zinc sulphate in the acid at various temperatures.

I have found that all the more concentrated acids dissolve much more zinc sulphate hot than cold, and that by treating the ores with such an amount of hot acid as to secure a solution approaching saturation, that the hot acid containing the zinc sulphate may be separated from the remainder of the ore and then cooled, and the greater part of the zinc be thus precipitated and readily separated from the acid. As the acid is used over again in the process the slight amount remaining in solution is not lost.

The appended diagrammatic figures give in a general way an approximate summary of the most important features of the solubility of zinc sulphate in various strengths of acid and at different temperature.

In said drawings,—

Fig. 1 shows two solubility curves for $ZnSO_4$ in concentrated sulphuric acids of different strength at the boiling points of the acids and in the cold acids. Curve A shows the solubility in the different strength acids, i. e. different percentages of $H_2SO_4$, at or near the boiling point of these acids. Curve B shows the solubility in the different strength acids when cold, i. e. at 30° C. The coordinates used for plotting the curves are, as abscissæ the strength of acid, i. e. per cent of $H_2SO_4$ in the mixture of acid and water, and as ordinates the volume per cent of zinc held in solution. The volume per cent zinc (i. e. the density of the acid taken as 1) is used in order to simplify all computations made from the curves since it is the amount of zinc in a given volume of acid which would be used in practically all calculations and not the actual percentage of zinc in the acid. The boiling points of acids of different strengths are noted at different points on curve A, and the character of the zinc salt precipitated by cooling the saturated solution in acids of different strengths is indicated at different points in the area between the two curves.

Figure 2:
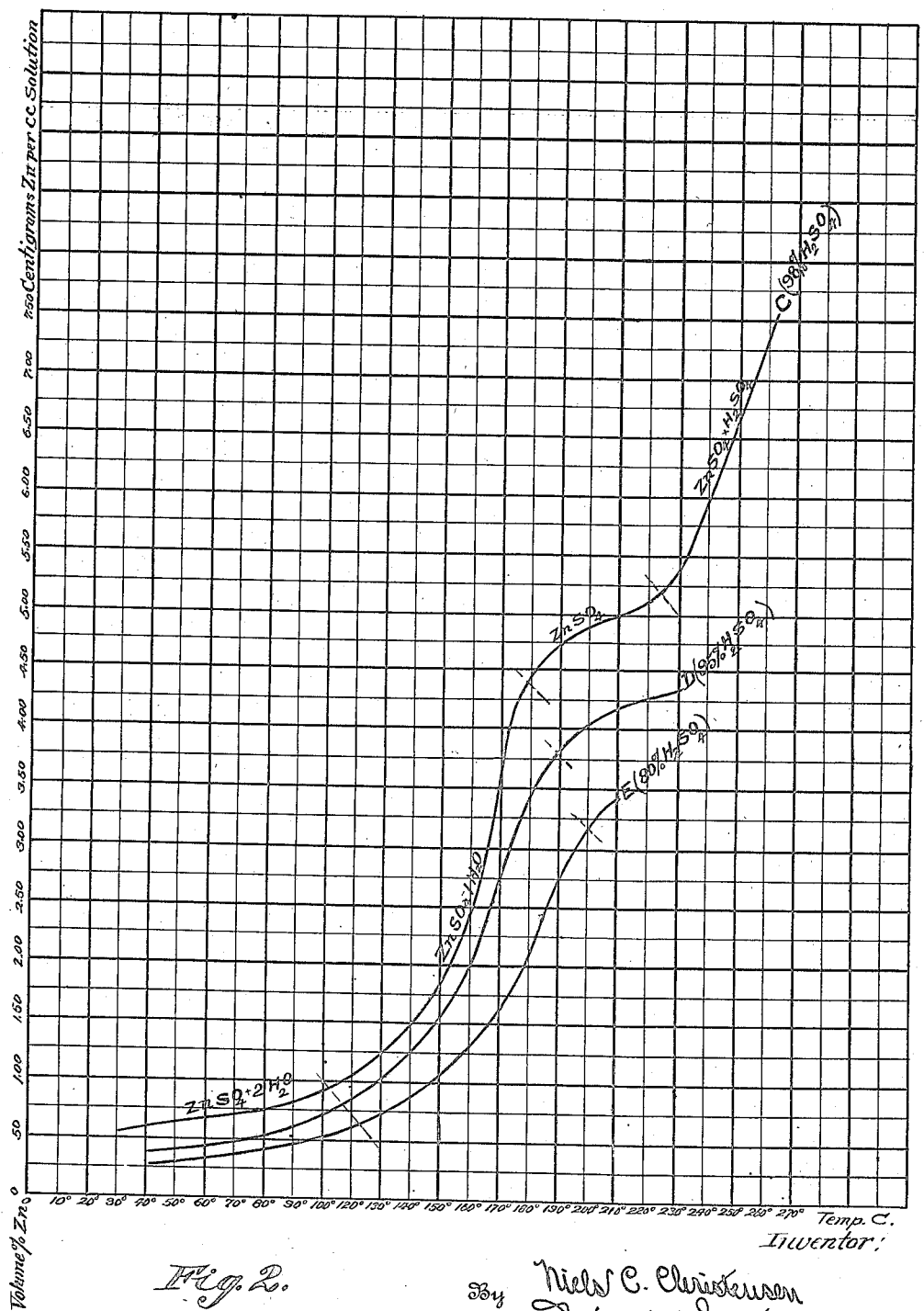

Fig. 2 shows three solubility curves of $ZnSO$ in concentrated sulphuric acids of different percentages of $H_2SO_4$ showing the solubility from the boiling point of the acid to 30° C., the coordinates used being temperature in degrees C. and volume per cent zinc held in solution. Curve C shows the variation in solubility with change in temperature from 260° C. to 30° C. in 98% acid (i. e. 98% $H_2SO_4$). Curve D shows the variation in solubility with change in temperature from 230° C. to 40° C. in 95% acid. Curve E shows the variation in solubility with change in temperature from 210° to 40° in 80% acid.

Figure 3:
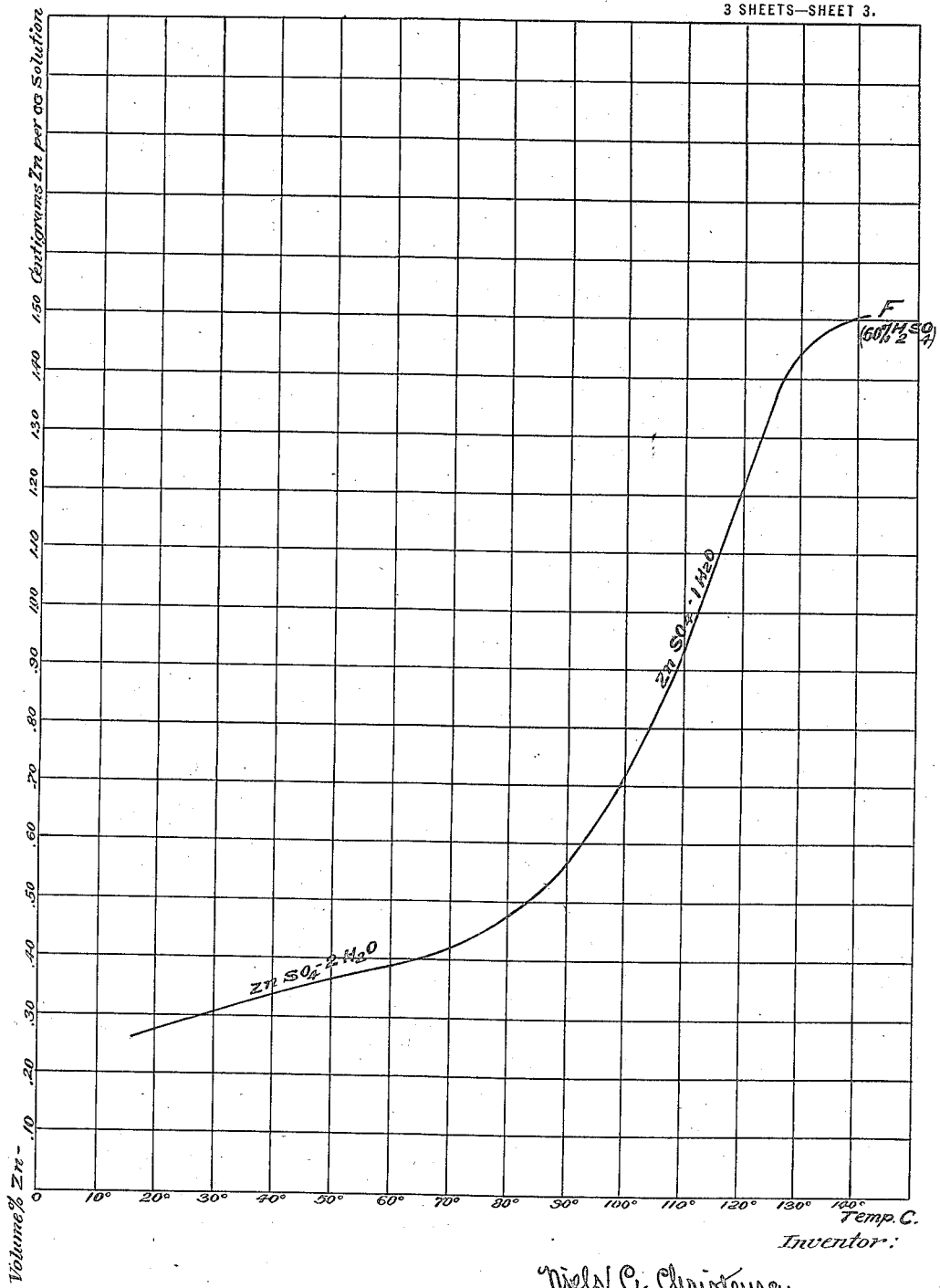

Fig. 3 shows a curve F illustrative of the variation in solubility with change in temperature from 140° C. to 20° C. in 60% acid.

On each of these curves the character of the zinc salt being precipitated at the different temperatures is indicated in a very general way by the formula written above the curves. These curves, though not accurate in the very highest degree, give in a very compact form a great amount of data of sufficient accuracy for practical purposes and show very clearly the action of the process with regard to the solubility features with different strengths of acid (i. e. percentage of $H_2SO_4$ in the acid) at different temperatures.

Curves A and B, Fig. I, show the solubility of zinc sulphate in various strengths of acid when hot and cold. (By term volume % zinc used as one of the coordinates is meant the percentage of zinc figuring the specific gravity of the acid as 1, i. e. it is the weight in centigrams of zinc held in solution in one cubic centimeter of acid.) Curve A shows the solubility in the different strengths of acid near the boiling point of the acids. Curve B shows the solubilities at 30° C. The length of any ordinate between the two curves A and B gives the amount of zinc which will be precipitated out of the strength of acid indicated by that ordinate by cooling the saturated solution from just below its boiling point to 30° C. The length of that ordinate beneath curve B gives the amount of zinc not precipitated upon cooling. The ratio of the length of ordinate between the two curves to the length beneath curve A gives the proportion of the zinc precipitated from a saturated solution upon cooling from near the boiling point.

The removal of the zinc sulphate from the solution is just as important a part of the process as the bringing of zinc into solution. These curves indicate quite clearly what strengths of acid may be used to advantage in the process since the most feasible method of removing the zinc from the acid solution is by cooling the hot saturated solution and separating the precipitated zinc sulphate from the cold acid.

As is seen from the curves, from the hot saturated 50% acid approximately 2/3 rds of the zinc is precipitated by cooling, from 60% acid over 80%; from 80% acid, over 90%; from 98% acid, about 95%. The amount of $ZnSO_4$ held in the saturated cold solution per cubic centimeter in strengths of acid above 60% is nearly constant, being between .2% and .3% (volume per cent). The amount held in solution in the hot solution, near the boiling point increases rapidly above and below 60% acid. Below 60% acid the cold acid holds increasing amounts with decrease in per cent of acid until somewhat below 30% nearly the same amount of zinc is held in solution hot as cold. Below this point the curves separate again and become farther and farther apart as the solution becomes more nearly neutral. Thus from the curves A and B it is clearly seen that acids below 40% would be useless since the cold solution holds practically as much zinc as the hot solution. From the curves it is indicated that 50% acid might be used, but as before noted most complex ores will not yield all the zinc to acid of this strength. 60% acid, and stronger acids, dissolve practically all the zinc and precipitate most of the zinc on cooling, so that in general it may be stated that any strength of acid above 60% may be used and on some ores as low as 50% acid may be used.

It is of course desirable to use acid of the strengths which hold the largest amount of zinc sulphate when hot, but other considerations as noted, such as the effect on the remainder of the ore, temperature range, materials of construction, may be of more weight than the proportion of acid to be handled. Where large proportions of acid must be heated or cooled the temperature range is much shorter so that the heat required is not so widely different as might be supposed at first glance. However, heat interchanges should be used to conserve the heat with the acids near 60%.

The character of the zinc sulphate salt precipitated by cooling also varies with the strength of the acid. This is indicated in a general way in Plate I, the salt precipitated at the highest temperature being given. Below approximately 30% acid the transparent $ZnSO_4+6H_2O$ is the main precipitate. Between approximately 30% and 55% acid, the main precipitate is a white salt probably $ZnSO_4+2H_2O$; from 55% to 80% another white salt probably $ZnSO_4+1H_2O$ is precipitated; between 80% and 90% some anhydrous $ZnSO_4$ is precipitated; acids above 90% precipitate a crystalline salt probably of the composition $ZnSO_4+XH_2SO_4$. This salt is very bulky, and when precipitated from 98% acid carries a large amount of $H_2SO_4$ and is therefore not very well suited to separation from the acid or to subsequent treatment. The precipitates secured with acids between 55% and 80% are fine white granular precipitates which settle readily and are easily separated from the acid.

Curves C, D, E, Fig. 2 and curve F Fig. 3 approximately show the variation in solubility with change in temperature of 98%, 95%, 80% and 60% acids respectively, and the salts probably precipitated at different temperatures are indicated. From these curves it is apparent that the precipitate from a saturated solution of $ZnSO_4$ in an acid of any given concentration depends upon the temperature. For example, from the cooling 98% acid there is first precipitated $ZnSO_4+XH_2SO_4$, then a small amount of $ZnSO_4$; then a larger amount of $ZnSO_4$ 1 aq. and finally some $ZnSO_4$ 2 aq.; from the 95% acid very little $ZnSO_4.XH_2SO_4$ is precipitated but the other salts are precipitated in the order named; from 80% acid the main precipitate is $ZnSO_4$ 1 aq. followed by $ZnSO_4$ 2 aq. From 60% acid the main precipitate is also $ZnSO_4$ 1 aq. followed by some $ZnSO_4$ 2 aq.; from 40% acid $ZnSO_4$ 2 aq.; from 20% acid $ZnSO_4$ 6 aq. followed by some $ZnSO_4$ 7 aq., if the solution is cooled to 25° C.

The curves given and data thereon are obtained from experimental work in testing the process, and give in a general way the results obtained under the conditions of the tests which were run approximately as would be done in practice. The data thus presented is not claimed to be accurate in the highest degree, but does indicate quite clearly the main features of the process, which are that hot acids of a concentration above 50% dissolve the zinc sulphide minerals and the zinc sulphate formed may be recovered by cooling the concentrated solution and separating the zinc sulphate thus precipitated.

The strength of acid used upon any ore will depend upon the particular ore to be treated and the products it is desired to make and upon the exact method of treatment. If the ore is a mixture of zinc blende, galena and pyrite, acid of a strength between 60% and 70% would be best suited to the treatment as this strength of acid does not attack the galena or pyrite, and leaves all the silver with the galena and pyrite.

If the ore is a mixture of zinc blende, chalcopyrite and pyrite, an acid of higher percentage may be used to advantage, as the pyrite and chalcopyrite are not readily attacked. If the ore contains nothing but zinc blende and gangue the acids containing the higher percentages of $H_2SO_4$ could be used to advantage.

Two general methods of treatment may be used. In the first, the ore may be treated with enough of the hot concentrated acid to bring all the zinc into solution, the hot solution is then separated from the residue of pyrite, galena, or other sulphides, and gangue. The hot acid solution is then cooled and the precipitated zinc sulphate allowed to settle and separated from the cold acid, which is then used for the treatment of more ore.

In the second method the ore is treated with enough hot concentrated acid to sulphate all the zinc, the mixture of acid and ore is then allowed to cool and the zinc sulphate is precipitated and settled along with the ore, the cold acid solution is then separated from the ore and zinc sulphate, the zinc sulphate is then washed out of the ore with water or other suitable solvent. The former is the preferred method though the latter may be used when acids which sulphate and dissolve the lead are used on ores carrying galena.

By thus treating the sulphide ores of zinc with hot concentrated sulphuric acid, practically all the zinc may be removed as zinc sulphate, and the remainder of the ore may be left in a condition suitable for other treatments for the recovery of the other metals. For example, an ore containing blende, galena, pyrite and quartz, treated by this process with approximately 60% acid, gave a zinc sulphate product containing practically all the zinc, and a residue containing the galena, pyrite and quartz and the gold and silver. This residue is particularly well suited to flotation treatment for the separation of the sulphides (galena, chalcopyrite, pyrite, etc.) from the siliceous gangue giving a high grade smelting product.

It is also especially well suited to treatment by the processes described in my U. S. patent application Serial Nos. 327,400 and 327,401 for the recovery of the lead and the silver.

If a more concentrated acid is used, for example, 80% acid, some of the lead will be sulphated and a small amount will dissolve in the hot acid and come down with the zinc sulphate upon cooling. If the second method of treatment is used this would not cause any loss of lead, but the silver formerly in the zinc blende and the sulphated lead would remain in the cold acid. Most of this silver may be precipitated from the cold acid by the addition of a small amount of common salt. The salt will however not precipitate the silver from the hot solution. The sulphate lead may readily be recovered by treatment with a brine solution as described in my U. S. application Serial No. 327,400.

If the ore is a mixture of zinc blende and chalcopyrite and pyrite, practically all the zinc may be removed as a sulphate, leaving the pyrite and chalcopyrite and gangue in an excellent condition for concentration by flotation.

By suitable slight variations in treatment, the process can be used to great advantage in the treatment of ores containing a mixture of zinc blende with any mixture of the other sulphides, and may also be used to great advantage for the treatment of pure blende for the making of zinc sulphate.

As noted, 60% acid removes the sulphur from the blende as $H_2S$ from which the metallic sulphur is easily recovered. Very concentrated acids give metallic sulphur which is not easily recovered.

As before stated, the exact method of treatment and the exact strength of acid used will depend upon the character of the ore and the residual products desired and I do not therefore desire to be limited by the foregoing description but only by the appended claims.

The following example gives an idea of the efficiency of my process. A complex lead zinc sulphide ore containing 18% zinc, 8% Pb and 8 oz. Ag., gave an extraction of over 98% of the zinc, 100% of the lead and 97% of the silver in high grade products, the zinc product carrying no lead and the lead product only a fraction of a per cent of zinc.

In the practical application of the process to any ore the fineness of grinding, best strength of acid and necessary time of treatment, and most suitable range of temperature will of course have to be determined by experiment. In a general way the treatment will be as follows: The finely ground ore (or concentrate or other product will be agitated with the proper amount of the desired strength of hot sulphuric acid to bring the zinc into solution, the hot acid solution will then be separated from the remaining portion of the ore (by decantation or filtration or other suitable means) and cooled so as to precipitate the zinc sulphate, the precipitated zinc sulphate will then be separated from the cold acid (by decantation, filtration of other suitable means) and the acid used for the treatment of more ore. As before noted, if it is desired, the mixture of ore and pulp may be cooled together and the cold acid be separated from the mixture of ore and zinc sulphate, and the zinc sulphate be washed out of the ore with water. In the first method the amount of heat used in the process may be reduced to a minimum by transferring the heat from the hot pregnant acid to the cold barren acid in suitable countercurrent cooling and heating apparatus. Though the stronger acids carry more zinc when hot, I have found the acids near 60% best suited for the treatment of most complex ores, as the temperature range is less and there is less fouling of the acid; and the sulphur is much more easily recovered as it is separated from the blende as $H_2S$.

The process is not dependent upon any special form of apparatus, and I have therefore given the manner of its application in a general way, as the type of apparatus and materials of construction will depend upon the conditions of each case.

Having described my process, what I claim and desire to patent is:

1. The process of treating zinc sulphide ores and concentrates which consists in mixing said ores and the like with hot sulphuric acid of high enough concentration to decompose the zinc sulphide and form zinc sulphate and in sufficient quantity to dissolve said zinc sulphate and thereafter cooling said hot acid containing said zinc sulphate and precipitating zinc sulphate therefrom.

2. The process of treating zinc sulphide ores and concentrates which consists in mixing said ores and the like with hot sulphuric acid of high enough concentration to decompose the zinc sulphide and form zinc sulphate and in sufficient quantity to dissolve said zinc sulphate and thereafter cooling said hot acid containing said zinc sulphate and precipitating zinc sulphate therefrom and separating the cold acid from the precipitated zinc sulphate and using said acid in the treatment of more ore.

3. The process of treating zinc sulphide ores and concentrates which consists in mixing said ores and the like with hot sulphuric acid of high enough concentration to decompose the zinc sulphide and form zinc sulphate and in sufficient quantity to dissolve said zinc sulphate, and separating said hot acid containing said zinc sulphate from the residue of ore and cooling last said hot acid and precipitating zinc sulphate therefrom.

4. The process of treating zinc sulphide ores and concentrates which consists in mixing said ores and the like with hot sulphuric acid of high enough concentration to decompose the zinc sulphide and form zinc sulphate and in sufficient quantity to dissolve said zinc sulphate, and separating said hot acid containing said zinc sulphate from the residue of ore and cooling last said hot acid and precipitating zinc sulphate therefrom, and separating the cold acid from said precipitated zinc sulphate and using said acid in the treatment of more ore.

5. The process of treating zinc sulphide ores and concentrates which consists in mixing said ores and the like with hot sulphuric acid of high enough concentration to decompose the zinc sulphide and form zinc sulphate and in sufficient quantity to dissolve said zinc sulphate, and separating said hot acid containing said zinc sulphate from the residue of ore and treating said residue for the recovery of metals other than zinc.

6. The process of treating zinc sulphide ores and concentrates which consists in mixing said ores and the like with sufficient hot sulphuric acid containing over fifty per cent $H_2SO_4$ to decompose the zinc sulphide and dissolve the zinc sulphate formed and thereafter cooling said hot acid containing said zinc sulphate and precipitating zinc sulphate therefrom.

7. The process of treating zinc sulphide ores and concentrates which consists in mixing said ores and the like with sufficient hot sulphuric acid containing over fifty per cent $H_2SO_4$ to decompose the zinc sulphide and dissolve the zinc sulphate formed and thereafter cooling said hot acid containing said zinc sulphate and precipitating zinc sulphate therefrom and separating the cold acid from the precipitated zinc sulphate and using said acid in the treatment of more ore.

8. The process of treating zinc sulphide ores and concentrates which consists in mixing said ores and the like with sufficient hot sulphuric acid containing over fifty per cent $H_2SO_4$ to decompose the zinc sulphide and dissolve the zinc sulphate formed and thereafter separating said hot acid containing said zinc sulphate from the residue of ore and cooling last said hot acid and precipitating zinc sulphate therefrom.

9. The process of treating zinc sulphide ores and concentrates which consists in mixing said ores and the like with sufficient hot sulphuric acid containing over fifty per cent $H_2SO_4$ to decompose the zinc sulphide and dissolve the zinc sulphate and separating said hot acid containing said zinc sulphate from the residue of ore and cooling last said hot acid and precipitating zinc sulphate therefrom, and separating the cold acid from said precipitated zinc sulphate and using said acid in the treatment of more ore.

10. The process of treating zinc sulphide ores and concentrates which consists in mixing said ores and the like with sufficient hot sulphuric acid containing over fifty per cent $H_2SO_4$ to decompose the zinc sulphide and dissolve the zinc sulphate formed and separating said hot acid containing said zinc sulphate from the residue of ore and treating said residue for the recovery of metals other than zinc.

11. The process of treating zinc sulphide ores and concentrates which consists in mixing said ores and the like with sufficient hot sulphuric acid containing between sixty per cent and seventy per cent $H_2SO_4$ to decompose the zinc sulphide and dissolve the zinc sulphate formed and thereafter cooling said hot acid containing said zinc sulphate and precipitating zinc sulphate therefrom.

12. The process of treating zinc sulphide ores and concentrates which consists in mixing said ores and the like with sufficient hot sulphuric acid containing between sixty per cent and seventy per cent $H_2SO_4$ to decompose the zinc sulphide and dissolve the zinc sulphate formed and thereafter cooling said hot acid containing said zinc sulphate and precipitating zinc sulphate therefrom and separating the cold acid from the precipitating zinc sulphate and using said acid in the treatment of more ore.

13. The process of treating zinc sulphide ores and concentrates which consists in mixing said ores and the like with sufficient hot sulphuric acid containing between sixty per cent and seventy per cent $H_2SO_4$ to decompose the zinc sulphide and dissolve the zinc sulphate formed and separating said hot acid containing said zinc sulphate from the residue of ore and cooling last said hot acid and precipitating zinc sulphate therefrom.

14. The process of treating zinc sulphide ores and concentrates which consists in mixing said ores and the like with sufficient hot sulphuric acid containing between sixty per cent and seventy per cent $H_2SO_4$ to decompose the zinc sulphide and dissolve the zinc sulphate formed and separating said hot acid containing said zinc sulphate from the residue of ore and cooling last said hot acid and precipitating zinc sulphate therefrom, and separating the cold acid from said precipitating zinc sulphate and using said acid in the treatment of more ore.

15. The process of treating zinc sulphide ores and concentrates which consists in mixing said ores and the like with sufficient hot sulphuric acid containing between sixty per cent and seventy per cent $H_2SO_4$ to decompose the zinc sulphide and dissolve the zinc sulphate formed, and separating said hot acid containing said zinc sulphate from the residue of ore and treating said residue for the recovery of metals other than zinc.

In testimony whereof I have signed my name to this specification.

NIELS C. CHRISTENSEN.